(12) United States Patent
Baumgarte et al.

(10) Patent No.: US 10,596,745 B2
(45) Date of Patent: Mar. 24, 2020

(54) MOULD FOR FORMING HOLLOW ARTICLES FROM PARISONS

(71) Applicant: KHS CORPOPLAST GmbH, Hamburg (DE)

(72) Inventors: Rolf Baumgarte, Ahrensburg (DE); Michael Linke, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 16/302,765

(22) PCT Filed: May 16, 2017

(86) PCT No.: PCT/EP2017/000591
§ 371 (c)(1),
(2) Date: Nov. 19, 2018

(87) PCT Pub. No.: WO2017/198332
PCT Pub. Date: Nov. 23, 2017

(65) Prior Publication Data
US 2019/0291332 A1    Sep. 26, 2019

(30) Foreign Application Priority Data

May 19, 2016   (DE) .......................... 10 2016 006 066

(51) Int. Cl.
*B29C 49/56*   (2006.01)
*B29C 49/06*   (2006.01)
*B29L 31/00*   (2006.01)

(52) U.S. Cl.
CPC .............. *B29C 49/56* (2013.01); *B29C 49/06* (2013.01); *B29C 2049/563* (2013.01); *B29L 2031/7158* (2013.01)

(58) Field of Classification Search
CPC .......................... B29C 49/56; B29C 2049/563
See application file for complete search history.

(56) References Cited

U.S. PATENT DOCUMENTS 2,914,799 A  * 12/1959  Canfield ................. B29C 49/06
                                                          425/156
6,805,548 B1   10/2004  Evrard
(Continued)

FOREIGN PATENT DOCUMENTS

CA        2989274 A1 * 12/2016  ............. B29C 49/06
CH         710158 A2     3/2016
(Continued)

*Primary Examiner* — Robert B Davis
(74) *Attorney, Agent, or Firm* — Rankin, Hill & Clark LLP (57) ABSTRACT

The present invention relates to a mold for molding hollow bodies from parisons. It is the object of the invention to provide such a mold having a closing mechanism, which allows the mold to be securely held closed even under high pressure and which is in addition easy to clean. The object is achieved according to the invention by a two-part mold (1*a*, 1*b*) for molding hollow bodies, in particular containers, from parisons by way of a gaseous or liquid pressure medium introduced under pressure into the parison, in which at least a part of the mold (1*a*, 1*b*) is supported so it is rotatable about an axis of rotation (3), and therefore the two parts are transferable from an open position into a closed position, and wherein each mold part (1*a*, 1*b*) is connected to one end of a toggle lever (4*a*, 4*b*) so it is rotatable about an axis (5*a*, 5*b*) parallel to the axis of rotation (3). The two other ends of the two toggle levers are connected to one another and to an actuating mechanism (7, 8, 9) so they are rotatable about an axis (6) parallel to the axis of rotation. The mold is characterized according to the invention in that the toggle levers (4*a*, 4*b*) are located shortly before their dead center in the closed position of the mold and the actuating mechanism (7, 8, 9) exerts an elastic force on the connecting axis (6) of the toggle levers (4*a*, 4*b*) in the direction of their dead center.

7 Claims, 6 Drawing Sheets

(56) References Cited

U.S. PATENT DOCUMENTS

| | | | |
|---|---|---|---|
| 2004/0151797 A1 | 8/2004 | Mue et al. | |
| 2005/0238753 A1 | 10/2005 | Arakelyan et al. | |
| 2011/0287130 A1 | 11/2011 | Tsay et al. | |
| 2016/0250797 A1* | 9/2016 | Michel | B29C 49/30 425/150 |

FOREIGN PATENT DOCUMENTS

| | | | | |
|---|---|---|---|---|
| CN | 1239304 C | 2/2006 | | |
| CN | 201095186 Y | 8/2008 | | |
| CN | 105058750 A | 11/2015 | | |
| EP | 2435235 A1 | 4/2014 | | |
| FR | 2825659 A1 * | 12/2002 | | B29C 33/26 |
| JP | S39016941 B | 8/1961 | | |
| WO | WO-0069614 A1 * | 11/2000 | | B29C 33/28 |
| WO | 2016051373 A1 | 4/2016 | | |

* cited by examiner

MOULD FOR FORMING HOLLOW ARTICLES FROM PARISONS

The present invention relates to a mold for molding hollow bodies from parisons.

Hollow bodies, in particular containers, for example, bottles, are presently often molded in the blow molding method inside a closed mold from a parison made of a thermoplastic. In this case, the parison, which can consist of PET, for example, is firstly heated, such that it is plastically deformable, and introduced into a mold which corresponds to the shape of the container to be molded.

The mold is generally in two parts having a vertical partition plane parallel to the axis of symmetry of the container to be molded, and therefore it can be opened to remove the finished shaped container. The mold parts can also comprise the bottom of the container to be molded, or a separate bottom mold can be used, which is not of further significance for the invention to be described, however. In the scope of this application, a two-part mold will thus generally be referred to, although the mold can comprise still further parts irrelevant to the invention, namely, for example, a bottom part.

The shaping of the container takes place after the introduction of the parison into the mold by introducing a pressure medium into the parison, wherein the pressure medium can be gaseous or liquid. If a gaseous medium is used in the classical blow molding method, a container is shaped, which can optionally be filled in the next step. If a liquid pressure medium is used in hydraulic container shaping, the filling material can be used as the pressure medium, and therefore a filled container, for example, a water bottle, can be produced in one work step. Both alternatives are to be comprised here, since the invention described hereafter is usable for both methods. The advantages of the invention emerge in particular in hydraulic shaping, however.

During the container shaping, the pressure medium is introduced under high pressure into the parison, wherein the parison is axially and radially stretched, possibly with the aid of a stretching bar, and therefore the material is applied to the inner face of the mold and forms the container.

The pressure increase is the greatest in this case toward the end of the molding process, when the container is practically completely shaped and presses against the mold. The pressure increase is particularly large if a liquid, incompressible pressure medium is used. For the precise shaping of the container, it is important for the two-part mold to be held securely in the closed position even against the high pressure and in particular the pressure peak at the end of the molding procedure. In particular, the play possibly existing in the mechanism has to be compensated for in order to prevent a slight opening of the mold, the so-called breathing.

One known possibility for compensating for the play is the installation of at least one mold half on a mold carrier on a type of air cushion, such that the mold can be closed and the mold carrier can be held closed. The actual mold halves are pressed against one another by the air cushions, and therefore a play of the closing mechanism can be compensated for. In the case of gaseous pressure media for the container shaping, the pressure medium can also be used for the air cushion.

Alternatively, for example, the mold parts can also be held closed by pneumatically or hydraulically driven wedges.

The disadvantage of the known embodiments is, however, that the structure of the mold thus becomes more complex, which results in more difficult cleaning of the mold. In particular in the case of hydraulic molding and simultaneous filling, spraying of filling material into the mold or bursting of a container during the molding can occur. For hygienic reasons, the molds of a blow molding station and in particular a station for simultaneous molding and filling of a cleaner have to be regularly cleaned, which is complex in the case of complex designs, such as the above-described approaches having air cushions or additional moving wedges.

It is therefore the object of the invention to propose a mold for molding hollow bodies from parisons, having a closing mechanism which enables the mold to be held securely closed even under high pressure and is additionally simple to clean.

The object is achieved according to the invention by a two-part mold for molding hollow bodies from parisons, in particular containers, by a gaseous or liquid pressure medium introduced under pressure into the parison, in which at least a part of the mold is supported so it is rotatable about an axis of rotation, and therefore the two parts are transferable from an open position into a closed position, and wherein each mold part is connected to one end of a toggle lever so it is rotatable about an axis parallel to the axis of rotation. The two other ends of the two toggle levers are connected to one another and to an actuating mechanism so they are rotatable about an axis parallel to the axis of rotation of the mold part. The mold is characterized according to the invention in that the toggle levers are located shortly before their dead center in the closed position of the mold and the actuating mechanism exerts an elastic force on the connecting axis of the toggle levers in the direction of their dead center.

At least a part of the mold according to the invention is supported so it is rotatable about an axis, and therefore it can be transferred from an open mold into a closed mold in relation to a stationary second mold part. The mold can also be designed such that both mold parts are each rotatable about an axis of rotation, and therefore both parts move during the opening and closing of the mold. The axis of rotation can also be a common axis of rotation.

The closing mechanism of the mold comprises a pair of first toggle levers, each of which is connected at one end to respectively one mold part. The connection is carried out so it is rotatable about an axis which extends parallel to the axis of rotation of the mold part or parts.

The first toggle levers form a double toggle lever, in that they are connected to one another at their other end, specifically so they are rotatable about an axis which again extends parallel to the axis of rotation of the mold part or parts.

The double toggle lever formed from the two toggle levers is connected to an actuating mechanism, which can effectuate the movement between the open position and the closed position.

In the closed position of the mold, the double toggle lever formed from the two toggle levers is located shortly before its dead center. In this position, the actuating mechanism exerts an elastic force on the connecting axis of the two toggle levers in the direction of the dead center position of the double toggle lever. The mold can thus be held closed reliably with a relatively low force.

The actuating mechanism can preferably have a secondary toggle lever, which acts on the double toggle levers and which can preferably exert the elastic force. The elastic force can be exerted, for example, by an actuator in the secondary toggle lever.

The complex mechanism for keeping the mold closed is therefore spatially separated from the mold. In particular in the case of hydraulic container shaping, it is not located directly in the spray region which is at risk of soiling. It can therefore be shielded, for example, by protective walls in a molding and filling system, and therefore there is no risk of soiling if liquid filling material sprays or a container bursts in the mold. The mold can be cleaned without problems, without also having to include the closing mechanism.

The closing mechanism of the mold can preferably have a plurality of toggle levers parallel to one another, which engage on the mold in different positions. The mold can thus be held closed uniformly over its entire height.

An exemplary embodiment of the invention will be explained in greater detail hereafter on the basis of the appended figures. In the following figures.

All illustrations are to be understood as an illustration of the principle of the invention. They are sometimes shown in simplified form to illustrate the invention. A person skilled in the art can readily change the size relationships of the individual components to one another with his knowledge in the art or adapt them to the specific requirements.

Figure 1:
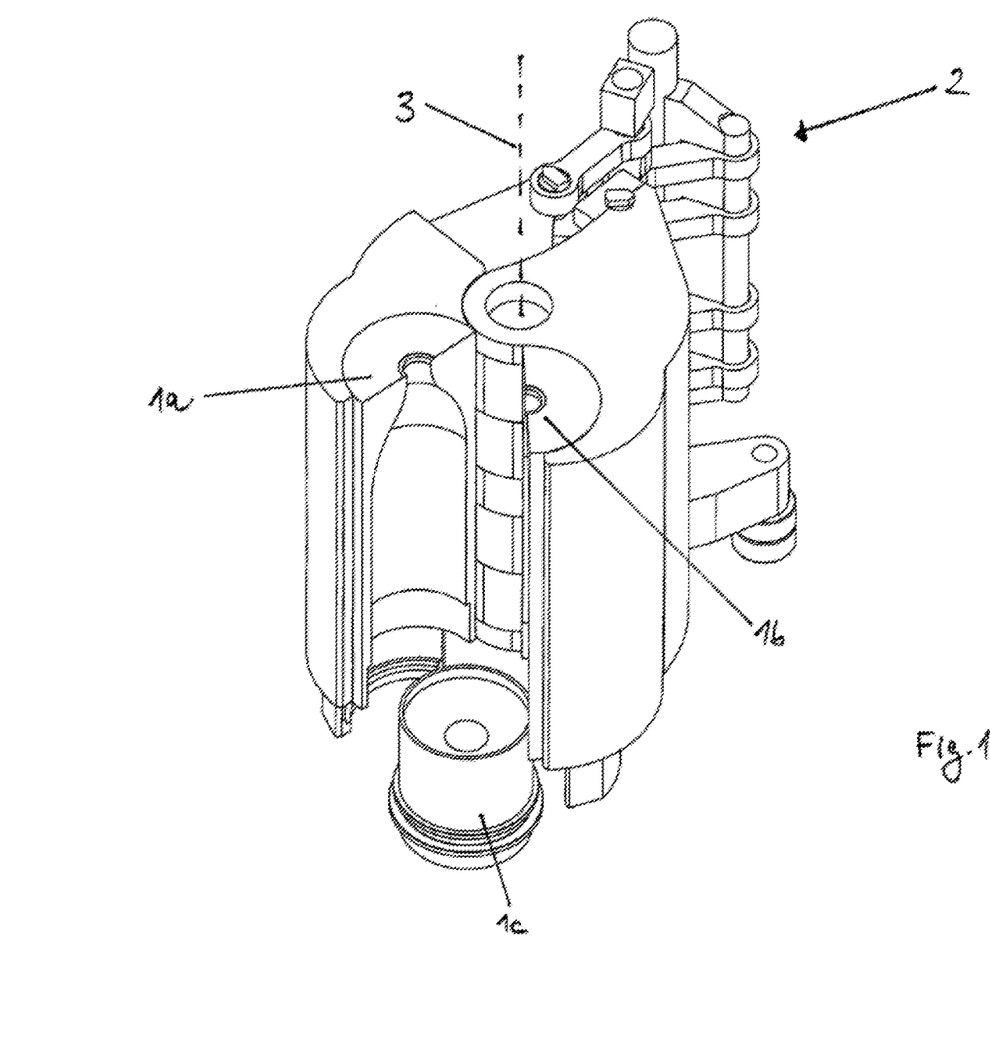
FIG. 1 shows an exemplary embodiment of a mold according to the invention in a perspective illustration in the open position.

FIG. 1 shows a mold according to the invention for molding a bottle in the open position in a perspective illustration. The mold consists of a first part $1a$ and a second part $1b$ and also a mold part $1c$ for the bottom of the bottle. The mold parts $1a$ and $1b$ may be moved from an open position into a closed position by a closing mechanism 2. The bottom part $1c$ is clamped in this case between the two mold parts $1a$ and $1b$. The bottom could also be formed on the mold parts $1a$ and $1b$, and therefore a two-part mold will still be referred to here with respect to the invention, although the mold can have still further components for various reasons.

The two mold parts $1a$ and $1b$ are supported so they are rotatable about a common axis of rotation 3, and therefore they can be transferred from the illustrated open position into a closed position.

Figure 2:
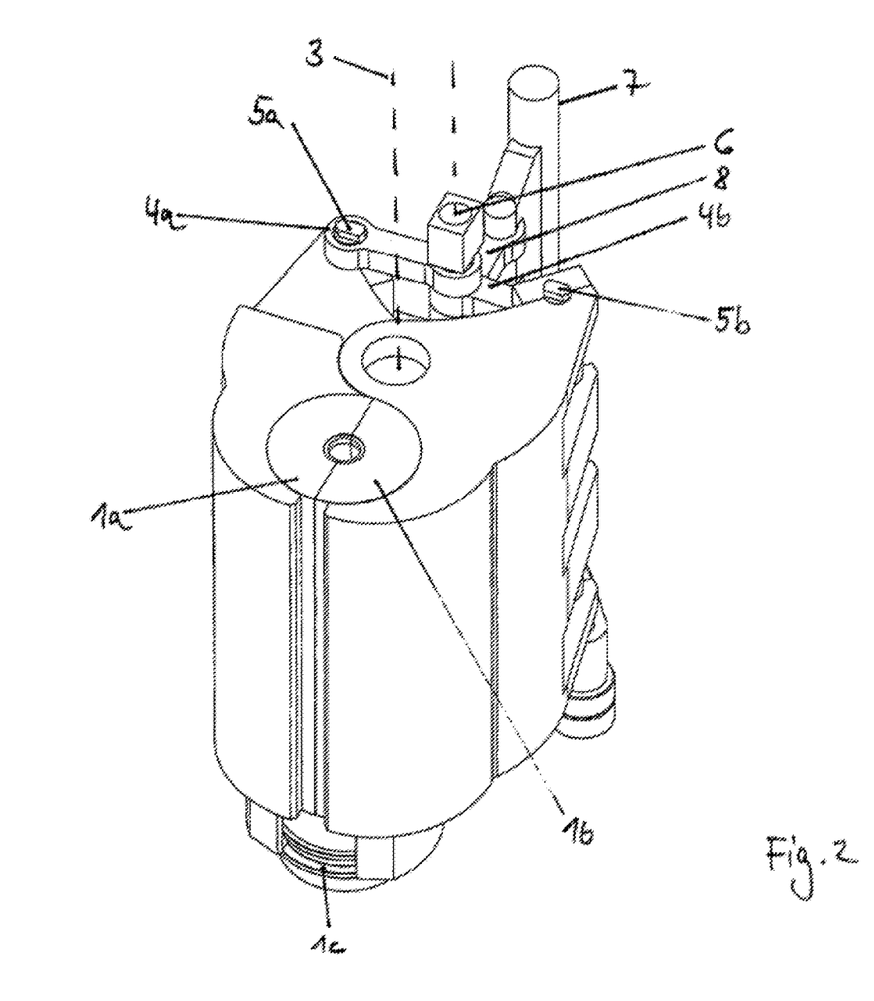
FIG. 2 shows the exemplary embodiment from FIG. 1 in the closed position.

FIG. 2 shows the mold from FIG. 1 in the closed position. The two mold parts $1a$ and $1b$ are each supported at one end of a toggle lever $4a$, $4b$ so they are respectively rotatable about an axis of rotation $5a$, $5b$. The toggle levers $4a$, $4b$ are connected at their other ends so they are rotatable about an axis of rotation 6, and therefore a double toggle lever results from the toggle levers $4a$, $4b$.

All mentioned axes of rotation 3, $5a$, $5b$, and 6 are parallel to one another.

An actuating mechanism 7, which has a secondary toggle lever 8, additionally engages on the axis of rotation 6.

Figure 3:
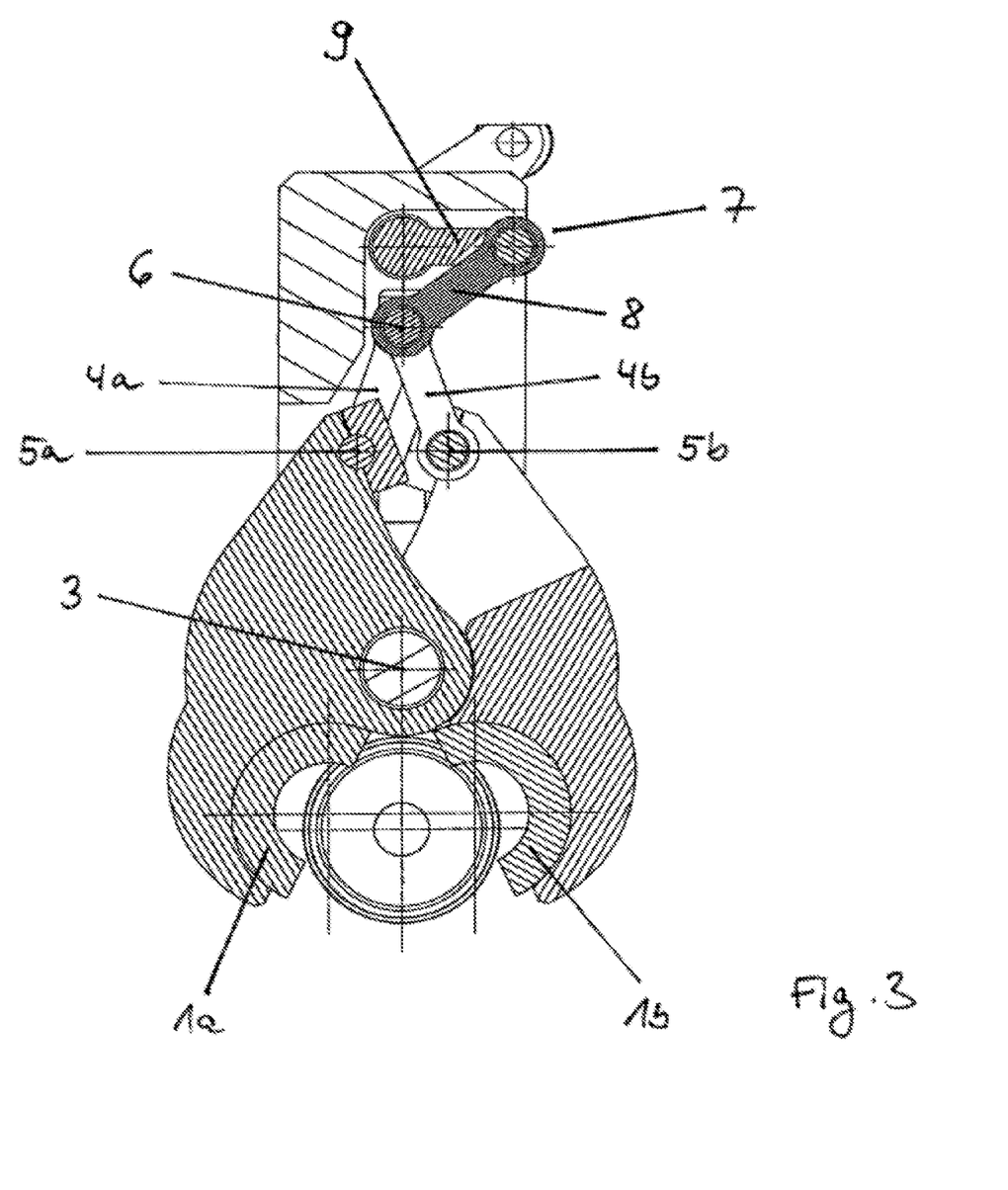
FIG. 3 shows the exemplary embodiment from FIGS. 1 and 2 in the open position in an illustration in partial section from above.

FIG. 3 shows the exemplary embodiment from FIGS. 1 and 2 in an illustration in partial section from above in the open position. The mold parts $1a$ and $1b$ are supported so they are rotatable about the common axis of rotation 3 and are connected to the toggle levers $4a$ and $4b$, which are supported so they are rotatable about the axes $5a$ and $5b$. The toggle levers $4a$, $4b$ are connected both to one another and also to the actuating mechanism 7 so they are rotatable about the axis of rotation. The actuating mechanism 7 comprises a secondary toggle lever 8, which driven by a positioning lever 9.

Figure 4:
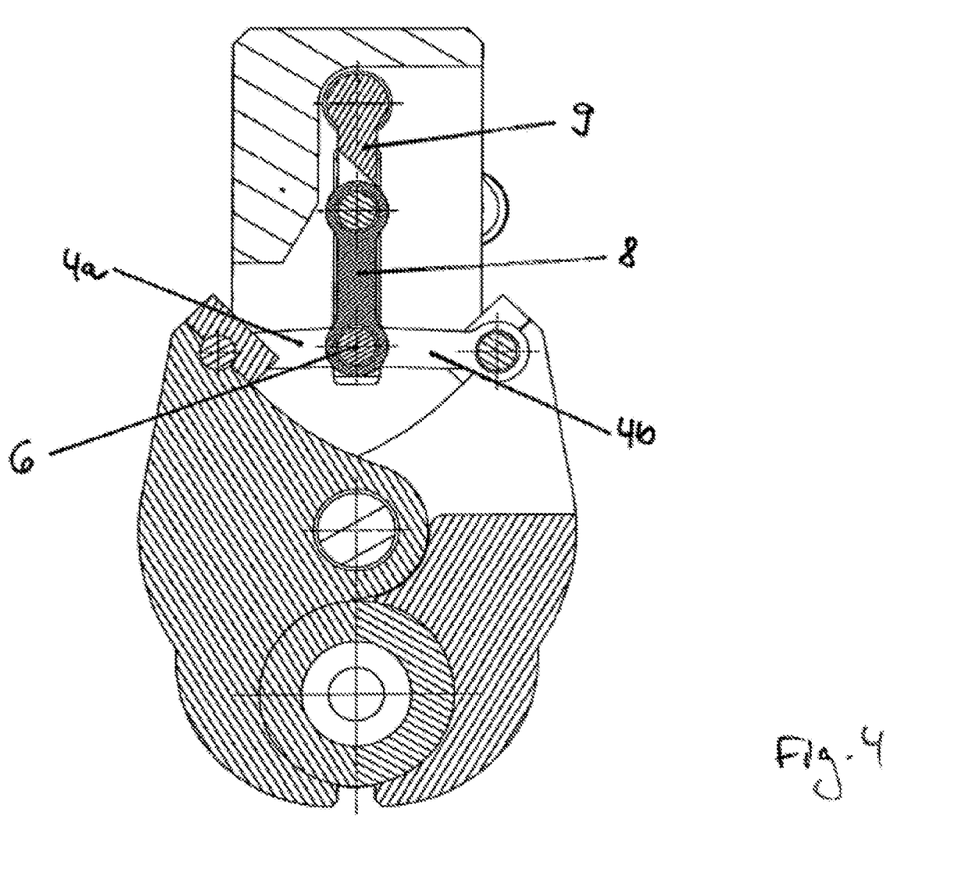
FIG. 4 shows the illustration from FIG. 3 in the closed position.

FIG. 4 shows the mold according to FIG. 3 in the closed position. The positioning lever 9 is rotated for this purpose by approximately 45°, whereby the secondary toggle lever 8 moves the double toggle levers $4a$, $4b$ into an extended position, and therefore they are located shortly before their dead center when the mold parts $1a$, $1b$ are closed.

The secondary toggle lever 8 comprises an actuator in this case, which exerts an elastic force on the connecting axis 6, and therefore the double toggle levers $4a$, $4b$ are pressed in the direction of their dead center position. In this manner, substantial forces for keeping the mold parts $1a$, $1b$ closed can be applied using a comparatively low force.

Figure 5:
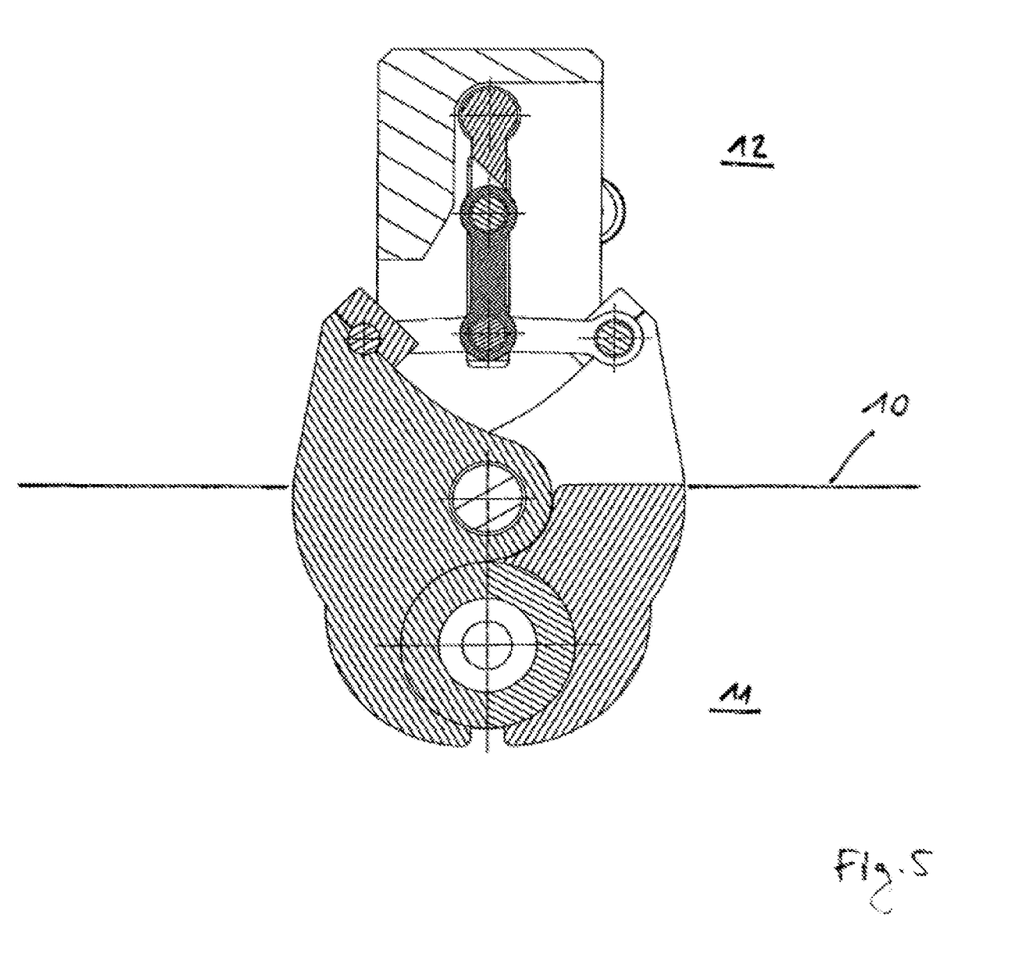
FIG. 5 shows the exemplary embodiment from FIG. 4 with an additional protective wall.

FIG. 5 shows a mold as in FIG. 4, in which an additional protective wall 10 is arranged between the region 11 of the mold in the region 12 of the closing mechanism. The closing mechanism of the mold is spaced apart from the mold in any case due to the design according to the invention and is additionally protected by the wall. In particular in the case of the simultaneous shaping and filling of containers in hydraulic shaping, the closing mechanism is thus reliably protected from soiling due to possible sprayed filling material.

Figure 6:
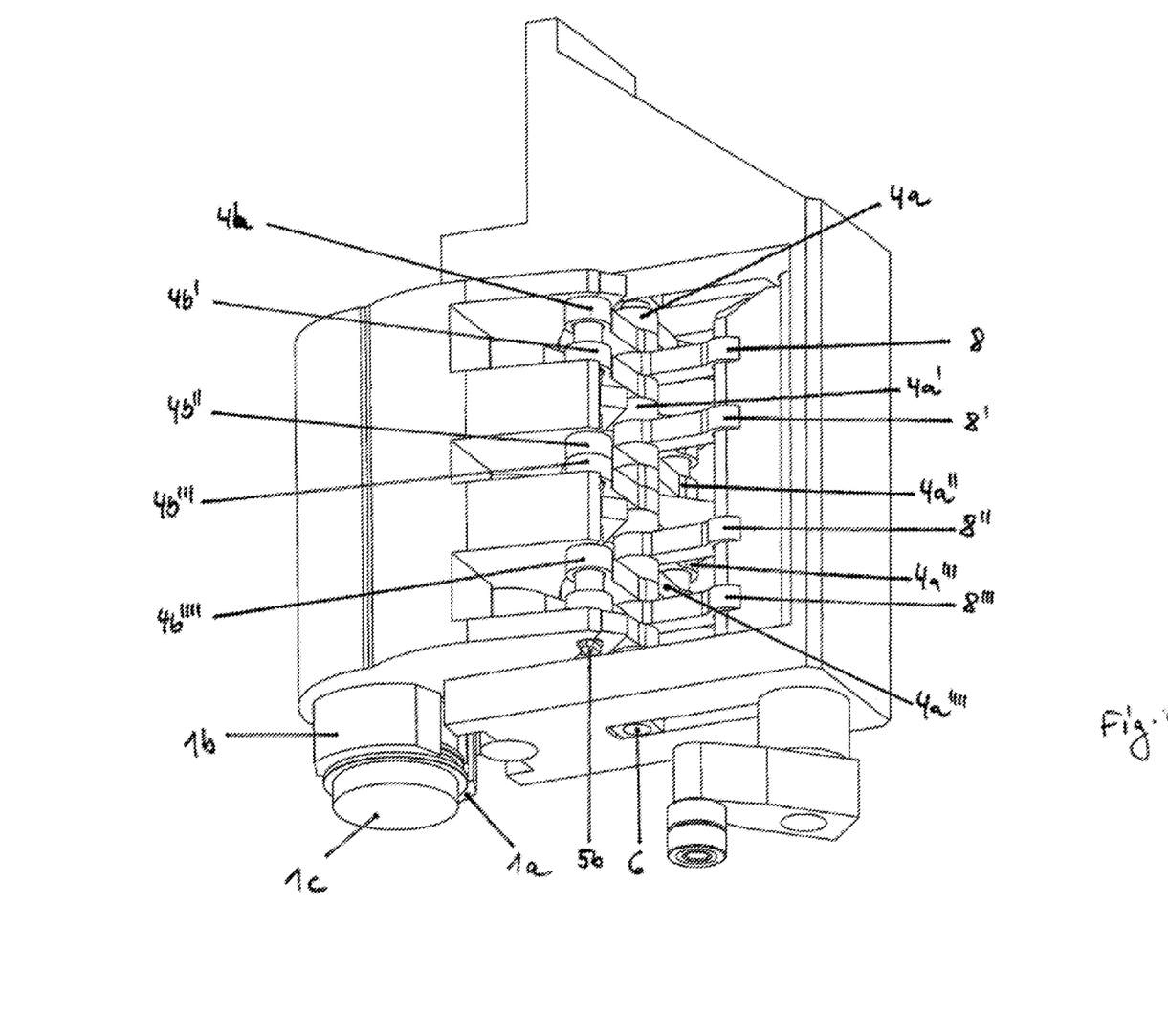
FIG. 6 shows the exemplary embodiment from the preceding figures in a perspective illustration from the side of the closing mechanism.

FIG. 6 shows the mold according to the preceding figures in a perspective illustration from the side of the closing mechanism in the closed position. It can be seen that a plurality of double toggle levers $4a$-$4a''''$, $4b$-$4b''''$ having identical dimensions are provided, which are supported so they are rotatable about common axes 5, 6. A plurality of secondary toggle levers $8$-$8'''$ engages at the axis 6. The force transmitted by the closing mechanism can thus be distributed uniformly over the entire height of the mold and the mold can be held closed reliably.

The invention claimed is:

1. A device comprising a mold carrier configured to receive mold sections for forming a hollow container from a parison through the introduction of a gaseous or liquid pressurized medium under pressure into the parison,
   wherein the mold carrier is divided into a first part for holding a first section of the mold and a second part for folding a second section of the mold,
   wherein the first part is supported such that it is rotatable about an axis of rotation such that the first part and the second part are transitionable between an open position and a closed position relative to each other,
   wherein the first part is connected to a first end of a first toggle lever such that the first toggle lever is rotatable about a first toggle lever first end axis of rotation that is parallel to the axis of rotation of the first mold part,
   wherein the second part is connected to a first end of a second toggle lever such that the second toggle lever is rotatable about a second toggle lever first end axis of rotation that is parallel to the axis of rotation of the first mold part,
   wherein a second end of the first toggle lever and a second end of the second toggle lever are connected to one another and to an actuating mechanism such that the first toggle lever, second toggle lever and the actuating mechanism are rotatable about a common connection axis that is parallel to the axis of rotation of the first mold part, wherein a knee lever is formed by the first toggle lever, the second toggle lever and the common connection axis, wherein, in the closed position, the first and second toggle levers are located shortly before a dead center position of the knee lever, and the actuating mechanism exerts an elastic force on the common connection axis in a direction towards the dead center position, and wherein the actuating mechanism further comprises a secondary toggle lever, which acts on the first and second toggle levers.

2. The device according to claim 1, wherein the second part is supported such that it rotates about an axis of rotation that is separate from but parallel to the axis of rotation of the first part.

3. The device according to claim 1, wherein the second part is supported such that it rotates in common about the axis of rotation of the first part.

4. The device according to claim 1, wherein the secondary toggle lever exerts the elastic force.

5. The device according to claim 1, wherein the elastic force is exerted by an actuator.

6. The device according to claim 1, further comprising a protective wall that separates the actuating mechanism from a region of the mold carrier that holds the first and second sections of the mold.

7. The device according to claim 1, wherein there are a plurality of first and second toggle levers and actuating mechanisms that are configured identically to the first and second toggle levers and the actuating mechanism, and wherein said plurality of first and second toggle levers and actuating mechanisms are arranged parallel to each other such that each engages a different part of the mold carrier.

* * * * *